(12) United States Patent
Grünwald et al.

(10) Patent No.: US 9,470,438 B2
(45) Date of Patent: Oct. 18, 2016

(54) THERMOELECTRIC TEMPERATURE CONTROL UNIT

(71) Applicant: Behr GmbH & Co. KG, Stuttgart (DE)

(72) Inventors: Jürgen Grünwald, Ludwigsburg (DE); Heiko Neff, Auenwald (DE); Dirk Neumeister, Stuttgart (DE); Manuel Wehowski, Stuttgart (DE); Martin Steinbach, Waiblingen (DE); Florin Moldovan, Stuttgart (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 554 days.

(21) Appl. No.: 13/930,022

(22) Filed: Jun. 28, 2013

(65) Prior Publication Data
US 2014/0013774 A1    Jan. 16, 2014

(30) Foreign Application Priority Data
Jun. 29, 2012   (DE) .................. 10 2012 211 259

(51) Int. Cl.
*F25B 21/02* (2006.01)

(52) U.S. Cl.
CPC .................... *F25B 21/02* (2013.01)

(58) Field of Classification Search
CPC ............ F25B 21/02; F25B 2321/0212; F25B 2321/025; H01L 35/30; H01L 35/32
USPC ............. 62/3.2, 3.3, 3.7; 165/164, 165, 166, 165/167, 170
See application file for complete search history.

(56) References Cited

U.S. PATENT DOCUMENTS 5,232,516 A * 8/1993 Hed ...................... H01L 35/30
                                                    136/203
6,161,616 A * 12/2000 Haussmann ......... B60H 1/3227
                                                    165/152

(Continued)

FOREIGN PATENT DOCUMENTS

CA     2 771 874 A1    3/2011
DE   198 25 561 A1    12/1999

(Continued)

OTHER PUBLICATIONS

European Search Report, Appl. No. 13171698.7, Jan. 28, 2015, 6 pgs.

(Continued)

*Primary Examiner* — Mohammad M Ali
(74) *Attorney, Agent, or Firm* — Paul D. Strain, Esq.; Strain & Strain PLLC

(57) ABSTRACT

The application relates to thermoelectric temperature control units, for example for controlling the temperature of an energy storage device in a motor vehicle. An exemplary embodiment comprises a Peltier element, having a first and a second surface, wherein the second surface is substantially adjacent or opposite to the first. The first surface is connected in a thermally conductive manner to a first and/or second flow duct, through which a fluid can flow. The second surface is connected in a thermally conductive manner to a heat-producing element, wherein the first flow duct is in fluid communication at one of the ends thereof with a first header, and the second flow duct is in fluid communication at one of the ends thereof with a second header, and the first flow duct and the second flow duct are in fluid communication at the respective second ends thereof with a common reversing header.

11 Claims, 7 Drawing Sheets

(56) References Cited

U.S. PATENT DOCUMENTS

| | | | |
|---|---|---|---|
| 6,226,994 B1 * | 5/2001 | Yamada | F25B 21/02 136/203 |
| 6,328,100 B1 | 12/2001 | Haussmann | |
| 6,557,354 B1 * | 5/2003 | Chu | H01L 35/30 62/259.2 |
| 6,615,590 B1 * | 9/2003 | Yaegashi | F28D 9/0075 165/164 |
| 6,807,811 B2 * | 10/2004 | Lee | F24F 5/0042 62/3.7 |
| 6,951,114 B2 * | 10/2005 | Grisham | F25B 21/02 62/259.2 |
| 2004/0112571 A1 * | 6/2004 | Kenny | F04B 17/00 165/80.3 |
| 2005/0210883 A1 * | 9/2005 | Bell | F02G 1/043 62/3.2 |
| 2006/0157102 A1 | 7/2006 | Nakajima et al. | |
| 2007/0034356 A1 * | 2/2007 | Kenny | F04B 17/00 165/80.4 |
| 2007/0199333 A1 | 8/2007 | Windisch | |
| 2008/0184710 A1 * | 8/2008 | DeVilbiss | F25B 21/02 62/3.2 |
| 2009/0007572 A1 * | 1/2009 | Bell | F02G 1/043 62/3.7 |
| 2012/0167597 A1 | 7/2012 | Wilder et al. | |

FOREIGN PATENT DOCUMENTS

| | | |
|---|---|---|
| EP | 0 952 017 A2 | 10/1999 |
| WO | WO 2007/026432 A1 | 3/2007 |
| WO | WO 2011/030339 A2 | 3/2011 |

OTHER PUBLICATIONS

German Search Report, DE 10 2012 211 259.6, May 2, 2013, 5 pgs.

* cited by examiner

THERMOELECTRIC TEMPERATURE CONTROL UNIT

CROSS-REFERENCE TO RELATED PATENT APPLICATIONS

This application is based upon and claims the benefit of priority from prior German Patent Application No. DE 10 2012 211 259.6, filed Jun. 29, 2012, the entire contents of which are incorporated herein by reference in their entirety.

TECHNICAL FIELD

A thermoelectric temperature control unit, in particular for controlling the temperature of an energy storage device in a motor vehicle, having at least one first Peltier element, which has a first surface and a second surface substantially adjacent or opposite to the first surface, wherein the first surface is connected in a thermally conductive manner to at least one first flow duct and/or one second flow duct, is advantageous.

PRIOR ART

Motor vehicles with electric additional drives or fully electric drives generally require electric energy storage devices. In order to keep these electric energy storage devices within an optimum temperature window at all times in respect of the performance thereof, these energy storage devices must be periodically cooled or heated, depending on ambient conditions.

In this context, there are demanding requirements on the homogeneity of the temperature distribution within the energy storage device in order, on the one hand, to ensure uniform power consumption and power output and, in addition, to avoid uneven aging processes due to different temperature stresses.

The cooling and heating capacity required for this purpose is generally significantly lower than the cooling and heating capacity required for controlling the temperature of a passenger compartment.

In currently known applications, the energy storage devices are either cooled by means of conditioned compartment air, by means of a coolant, the temperature of which is controlled by means of a "chiller" or a coolant circuit of the air conditioning system, or directly by means of a refrigerant.

Nowadays, the heating mode is generally provided by means of an internal electric short circuit or by means of external resistance heating elements.

Since, as already mentioned above, the required cooling capacity is generally significantly lower than in conventional systems used to control the temperature of the interior, downsizing of the components used is desirable.

In the literature, there are likewise also initial studies on the use of Peltier elements for controlling the temperature of energy storage devices. In this regard, however, there are no known solutions suitable for series production at present that provide sufficient cooling and heating capacity with an appropriate installation space requirement.

The disadvantage with the prior art is, in particular, the fact that Peltier elements generally entail a high power consumption in relation to the cooling capacity supplied, especially when the temperature differences between the hot and the cold side of the Peltier elements are relatively large. This is to be avoided especially in the context of electric vehicle applications, which are sensitive in terms of range.

DESCRIPTION OF THE INVENTION, PROBLEM, SOLUTION AND ADVANTAGES

It is therefore the object of the present invention to provide a thermoelectric temperature control unit which allows uniform temperature distribution and uniform heat output over the surface.

The object of the present invention is achieved by a thermal temperature control unit having the features according to claim 1. Advantageous developments of the present invention are described in the dependent claims.

One illustrative embodiment of the invention relates to a thermoelectric temperature control unit, in particular for controlling the temperature of an energy storage device in a motor vehicle, having at least one first Peltier element, which has a first surface and a second surface substantially adjacent or opposite to the first surface, wherein the first surface is connected in a thermally conductive manner to at least one first flow duct and/or one second flow duct, through which a first fluid can flow, and the second surface is connected in a thermally conductive manner to at least one first heat-producing element, wherein the first flow duct is in fluid communication at one of the ends thereof with a first header, and the second flow duct is in fluid communication at one of the ends thereof with a second header, and the first flow duct and the second flow duct are in fluid communication at the respective second ends thereof with a common reversing header.

In this way, the Peltier element can carry heat from one of the surfaces thereof to the other if a sufficient voltage is applied to the Peltier element. Sufficient heat transport can thus be achieved without the need to use mechanically moving parts. It is advantageous that the Peltier element is in very good thermally conductive contact both with the heat-producing element, from which it is generally supposed to remove heat, and with the flow ducts, to which the Peltier element is supposed to transfer the heat.

In an advantageous embodiment, the heat-producing element is one of the battery elements which together form the energy storage device.

It is furthermore advantageous if the first flow duct and the second flow duct run essentially parallel to one another.

It is also expedient if the first fluid in the first flow duct can flow as a countercurrent with respect to the first fluid in the second flow duct.

The countercurrent allows a particularly advantageous profile of the temperature level across the flow ducts. The fact that the fluid flows in one direction and flows back in the other direction results in different temperature levels in the first and the second flow ducts owing to the duration of contact with the heat-producing element.

Averaging the temperature level of the first and second flow ducts gives a temperature level with significantly less scatter than with an arrangement of flow ducts through all of which the flow is in the same direction.

It is furthermore to be preferred if the first surface of the Peltier elements is in thermal contact via a first plate with the first flow duct and/or the second flow duct.

Using a plate between the individual Peltier elements and the flow ducts enables better thermal connection of the Peltier elements to the flow ducts. This is advantageous particularly if the Peltier elements are wider than the individual flow ducts. The Peltier elements would otherwise project beyond the flow ducts, and a heat buildup could form in the gap between the flow ducts, with a disadvantageous effect on the efficiency of the thermoelectric temperature control unit.

The parallel alignment of the flow ducts, in particular in a common plane, makes it a particularly simple matter to connect the flow ducts to a plate in order to be able to achieve a level connecting surface for the Peltier elements that is independent of the structure of the flow ducts.

In an advantageous embodiment, the plate used can be composed of plastic or metal or ceramic. In a further advantageous embodiment, the plate used should have good thermal conduction properties.

In addition, it is expedient if the first plate has slots arranged between the first flow duct and the second flow duct.

By means of the slots, thermal bridges between the first and the second flow ducts can be avoided. However, care should be taken to ensure that the mechanical stability of the overall temperature control unit is not negatively affected by the slots in the plate. In all cases, the disadvantage which arises from any thermal bridges that are present is of secondary importance to any negative effect on mechanical stability.

It is also expedient if the common reversing header has fluid-conducting structures which carry the first fluid from the first flow duct into the second flow duct.

By means of fluid-conducting structures of this kind, it is possible to improve distribution into the first and second flow ducts.

It is furthermore advantageous if the second surface of the Peltier element is connected to a third surface of a second plate, and the fourth surface of the second plate is connected to the at least first heat-producing element.

By connecting the Peltier elements to a plate, it is possible to connect the heat-producing elements, which in one embodiment according to the invention are battery elements, to the Peltier elements in a particularly advantageous manner. Care should be taken to use a plate which has only a very low thermal resistance.

Moreover, it is expedient if the first header is thermally insulated from the second header.

This avoids a situation where an additional thermal bridge is formed between the first flow ducts and the second flow ducts.

It is also advantageous if the first header and the second header are implemented in a single component part.

Implementation in a single component part allows a particularly space-saving embodiment of the thermoelectric temperature control unit.

It is furthermore desirable if the thermoelectric temperature control unit has a plurality of first flow ducts and a plurality of second flow ducts, wherein the number of second flow ducts is preferably equal to or greater than the number of first flow ducts.

This has an advantage for the heat absorption of the two flow ducts. Owing to the tendency for a higher temperature in the second flow ducts, there is a lower driving temperature difference with respect to the Peltier elements than with the first flow ducts. This can advantageously be balanced out by having a larger number of second flow ducts than of first flow ducts.

It is also expedient if individual flow ducts or groups of flow ducts of the first flow ducts and of the second flow ducts are arranged alternately to one another.

This alternate arrangement of the flow ducts results in an advantageous distribution pattern, especially as regards temperature distribution over the first and second flow ducts.

It is furthermore advantageous if the thermoelectric temperature control unit has a plurality of Peltier elements and a plurality of heat-producing elements.

A plurality of Peltier elements allows greater heat transfer, and, as a result, the overall system has considerable advantages for commercial use.

BRIEF DESCRIPTION OF THE DRAWINGS

The invention is explained in detail below by means of an illustrative embodiment with reference to the drawing. In the drawing.

PREFERRED EMBODIMENT OF THE INVENTION

Figure 1:
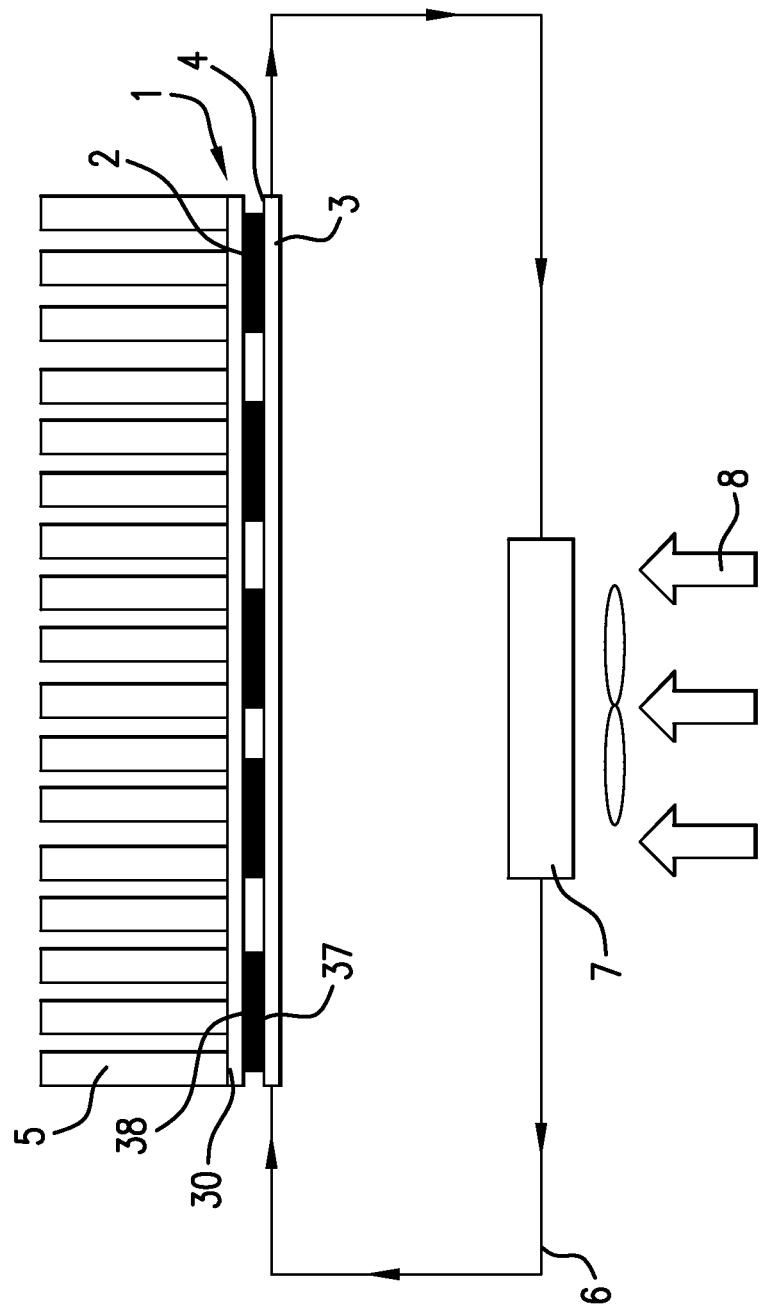
FIG. 1 shows a schematic view of the thermoelectric temperature control unit with a coolant circuit which serves for heat dissipation.

FIG. 1 shows a schematic view of a thermoelectric temperature control unit 1. In FIG. 1, the thermoelectric temperature control unit 1 is shown in section and, since the intention is to illustrate only the principle of the thermoelectric temperature control unit 1, it is not shown fully.

Arranged above the thermoelectric temperature control unit 1 is a plurality of battery elements 5, the temperature of which the thermoelectric temperature control unit 1 serves to control. The thermoelectric temperature control unit 1 consists essentially of a plurality of Peltier elements 2, which are capable of transferring heat from one of the outer surfaces thereof to the opposite outer surface through the application of a voltage. The battery elements 5 can thereby be either cooled or heated.

The focus of the invention is on the cooling of the battery elements 5. In order to be able to dissipate the heat absorbed by the battery elements 5 from the thermoelectric temperature control unit 1, the Peltier elements 2 must be in thermally conductive contact with a coolant flow, as indicated in FIG. 1 by reference sign 6.

For this purpose, a first surface 37 of the Peltier elements 2 is connected in a thermally conductive manner to a heat exchanger 3. In this arrangement, the heat exchanger 3 forms an interface with the cooling circuit 6 and can, for example, be formed by tubes, through which there is a flow of coolant. In the illustrative embodiment shown in FIG. 1, the first surfaces 37 are connected to the heat exchanger 3 by a plate 4, which is arranged as an intermediate element between the flow ducts 11, 12 of the heat exchanger 3 and the Peltier elements 2.

As an alternative, the thermally conductive connection can also be established directly with the heat exchanger 3 by applying the Peltier elements 2 to the flow ducts 11, 12 of the heat exchanger without an intermediate element. The second surface 38 of the Peltier elements 2, that opposite the first surface 37, is in thermal contact with one or more heat-producing elements. In FIG. 1, the heat-producing element is formed by a plurality of battery elements 5. The heat radiated by the battery elements 5 is transferred by the Peltier elements 2 to the contact points between the Peltier elements 2 and the cooling circuit 6 and is released from there to the coolant flowing in the cooling circuit 6.

The quantity of heat which is released to the coolant in the cooling circuit 6 is then cooled by a heat exchanger 7, through which a flow of external air 8 flows, and is released to the environment. The construction of the coolant circuit 6 and of those components contained therein which are outside the thermoelectric temperature control unit 1 is not the subject matter of the invention and is therefore not described further in detail.

The Peltier elements 2 are either connected directly to the battery elements 5 or, as shown in FIG. 1, via an intermediate medium, such as a plate 30.

In this context, care should be taken to ensure that there is always a good thermally conductive connection between the Peltier elements 2 and the heat source or the heat sink formed by the coolant in the coolant circuit 6.

Figure 2:
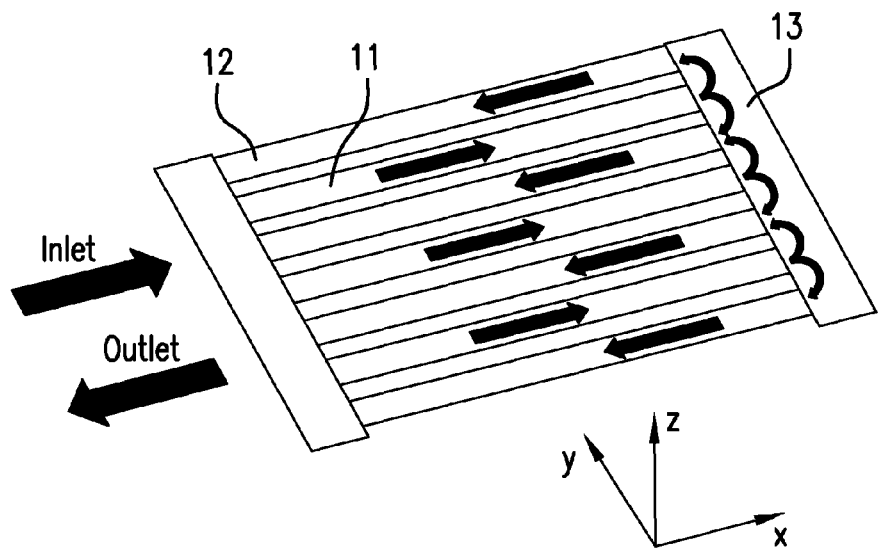
FIG. 2 shows a schematic illustration of the flow principle of the thermoelectric temperature control unit.

FIG. 2 shows a schematic view of the flow principle of the flow ducts 11, 12. A first fluid flows through the flow ducts 11, 12 as well as in the coolant circuit 6. The direction of flow within the first flow ducts is opposed to the direction of flow in the second flow ducts 12.

In order to achieve this, the fluid, after flowing through the first flow ducts 11, is deflected in a reversing header 13 arranged at the end of the first flow ducts 11 and the second flow ducts 12, ensuring that the fluid then flows back through the second flow ducts 12 in the opposite direction of flow.

For this purpose, the first flow ducts 11 are supplied jointly with the fluid by a header box. There is likewise a second header box, which collects the fluid again after it has flowed through the second flow ducts and carries it out of the thermoelectric temperature control unit 1. The two header boxes are not shown in FIG. 2. Further details thereof are given in the following figures.

Fluid guiding devices can be provided within the reversing header 13. However, this is not essential since the primary direction of flow is fundamentally already determined by the inflow through the first flow ducts 11 and the outflow of the fluid through the second flow ducts 12.

The use of additional fluid guiding devices can be appropriate if uneven distribution of the fluid over the flow ducts 11, 12 occurs.

Figure 3:
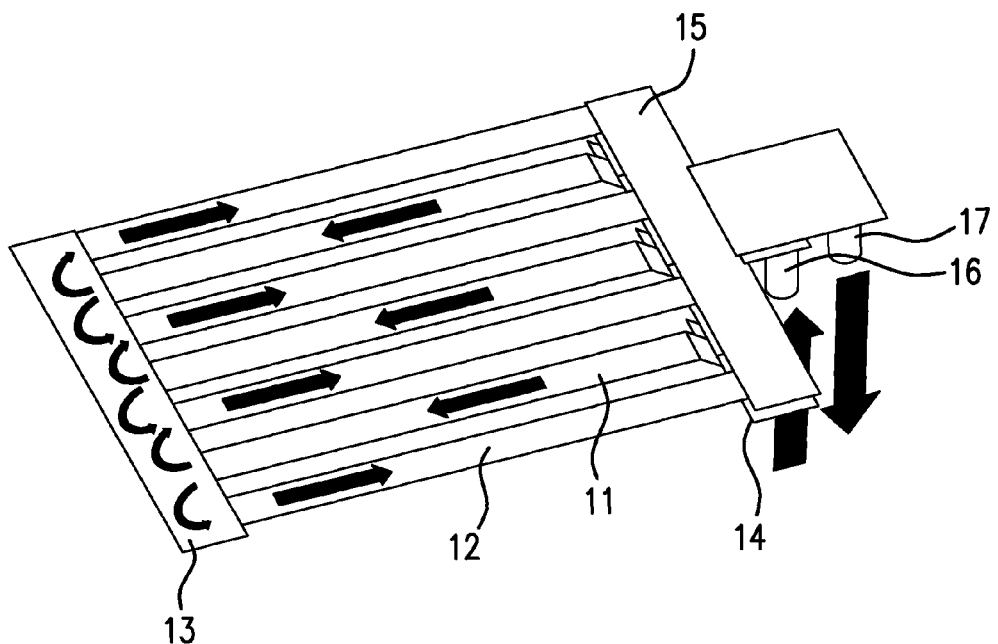
FIG. 3 shows a schematic illustration of an arrangement of the inlet header box and of the outlet header box in different planes.
Figure 7:
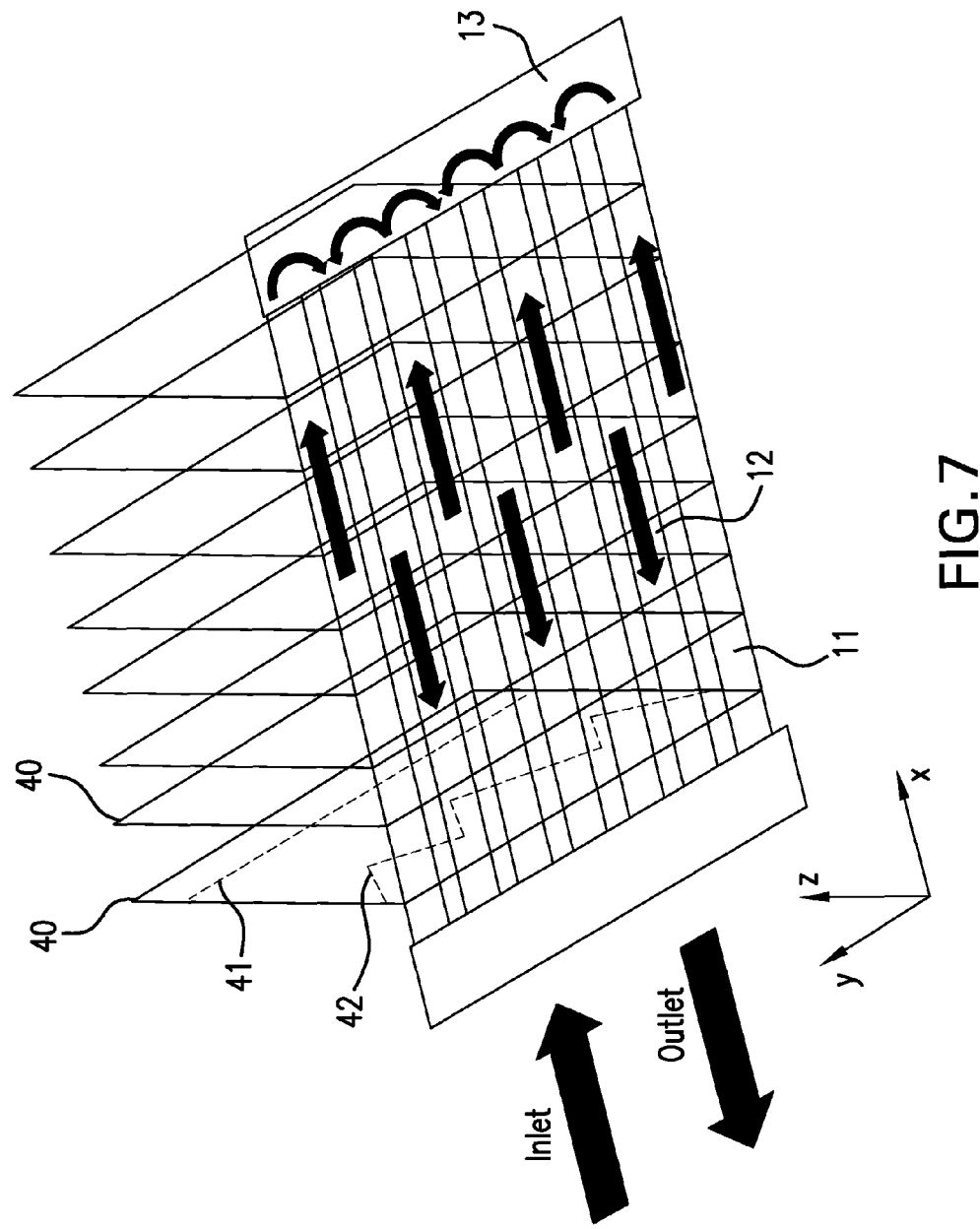
FIG. 7 shows a schematic illustration of the thermoelectric temperature control unit with the battery elements indicated.
Figure 8:
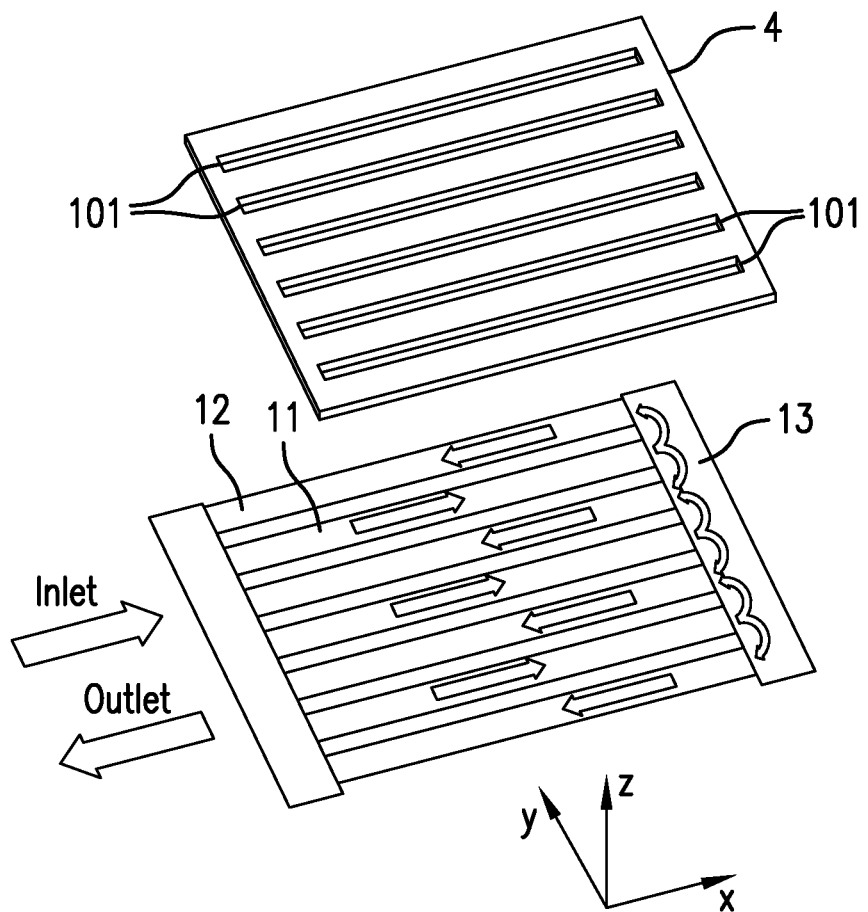
FIG. 8 shows a schematic illustration of the flow principle of the thermoelectric temperature control unit showing plate (4) having slots (101).

FIG. 3 likewise shows a schematic view of the flow principle of the thermoelectric temperature control unit 1. As in FIG. 2, only the first and second flow ducts 11, and the reversing header 13 are shown. For the sake of clarity, the Peltier elements 2 and the battery elements 5 or additional plate elements 4, 30 have been omitted from the illustration. This is also the case in FIGS. 2, 4 and 7.

In addition, FIG. 3 now shows an inlet branch 16, which is in fluid communication with an inlet header 14, and an outlet branch 17, which is in fluid communication with an outlet header 15.

For its part, the inlet header 14 is in direct fluid communication with the first flow ducts 11. The outlet header 15 is likewise in direct fluid communication with the second flow ducts 12.

In the embodiment shown in FIG. 3, the outlet header 15 is in one plane with the reversing header 13, the first flow ducts 11 and the second flow ducts 12. The inlet header 14, for its part, is offset downward out of this plane and thus lies below the outlet header 15.

In this way, it is possible to achieve thermal insulation between the inlet header 14 and the outlet header 15. This is advantageous, in particular, because thermal bridges between the fluid before it flows through the thermoelectric temperature control unit 1 and after flowing through the latter can thereby be avoided.

In order to ensure connection of the first flow ducts 11 to the inlet header 14, the first flow ducts 11 have a kinked shape in the region of the inlet header 14, said shape leading out of the plane of the other component parts and to the inlet header 14.

In alternative embodiments, it is likewise conceivable to take additional thermal insulation measures between the inlet header box and the outlet header box. It is likewise conceivable to configure the arrangement of the flow ducts and of the header boxes in a single plane, but this is not essential.

It is particularly advantageous if the arrangement of the first flow ducts 11 and of the second flow ducts 12 is always in an alternating sequence. In this way, a particularly homogeneous temperature pattern can be produced across the thermoelectric temperature control unit 1.

This results from the fact that the fluid in the first flow ducts 11 has a lower temperature level than the fluid in the second flow ducts 12 in the case of the cooling of the battery elements 5.

In alternative embodiments, it is also conceivable, as a departure from the illustration shown in the figures, in each case to arrange a plurality of first flow ducts 11 as a group and a group of second flow ducts 12 alternately to one another. The number of adjacent first flow ducts 11 and second flow ducts 12 should be chosen according to the planned use.

Figure 4:
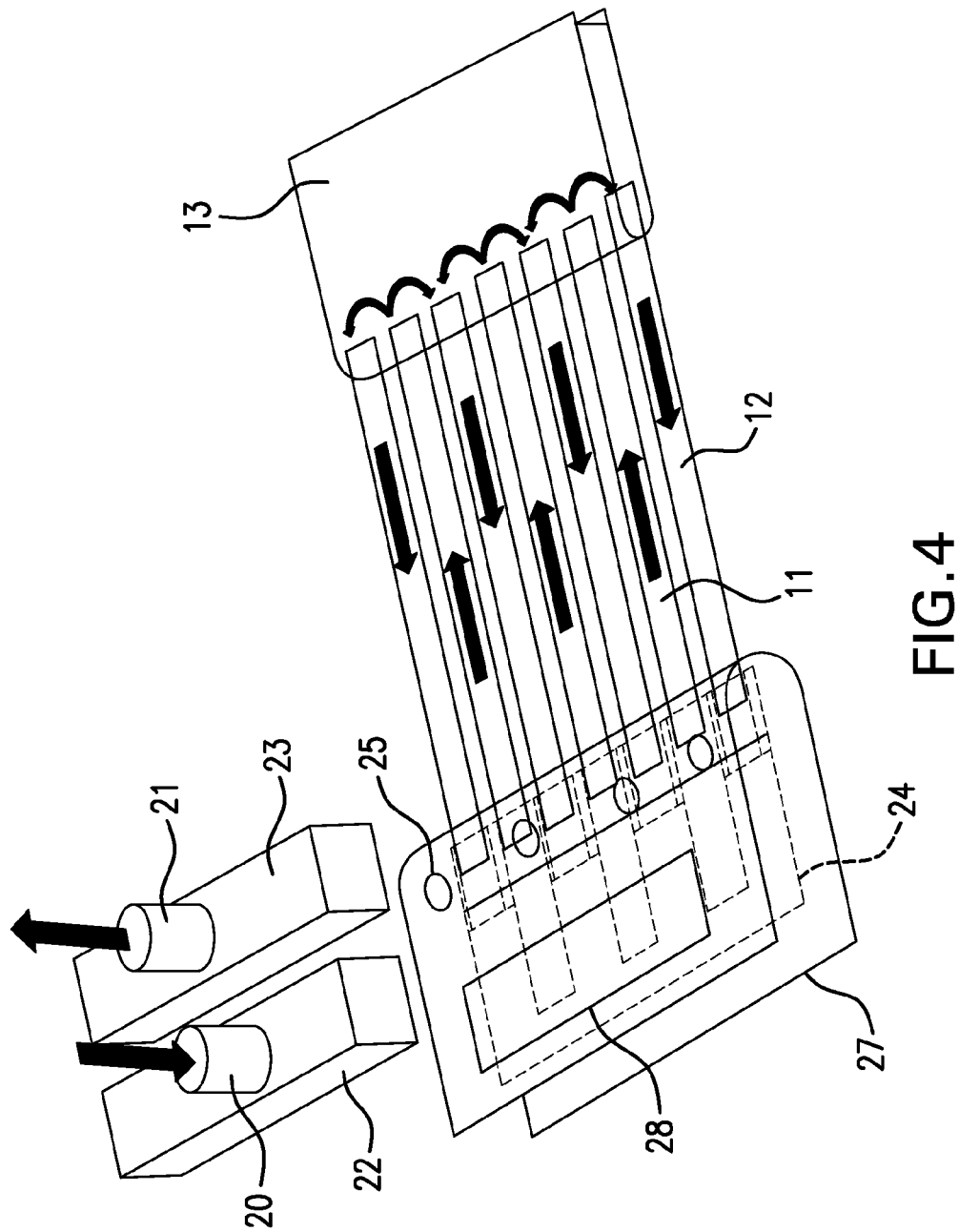
FIG. 4 shows a schematic perspective view of a thermoelectric temperature control unit, wherein the inlet header box and the outlet header box are implemented in a single component part.

FIG. 4 shows a further perspective view of a thermoelectric temperature control unit 1. In the version shown in FIG. 4, the inlet header 22 and the outlet header 23 are embodied in just one component part. For this purpose, the inlet box 27, which consists of an element bent in a U shape, has an insert 24 in its interior.

This insert 24 is embodied in such a way that it closes off the open region of the inlet box 27 which runs around three side faces, giving rise to a closed component part.

This insert 24 is furthermore embodied in a comb-like manner and allows a division into the first flow ducts 11 and the second flow ducts 12 within the inlet box 27. An aperture 28, to which the inlet header box 12 can be directly connected, is arranged on the upper side of the inlet box 27.

A plurality of outlet openings 25 is likewise arranged on the upper side of the inlet box 27. In the fully assembled state, said openings are covered by the outlet header box 23 and are additionally sealed off by the latter from the environment.

The insert 24 limits the length of the second flow ducts 12 within the inlet box 27 to such an extent that, after flowing through the second flow ducts 12, the fluid can flow only as far as the outlet openings 25 in the inlet box 27. The insert 24 thus forces the fluid that has flowed through the second flow ducts 12 through the outlet openings 25, into the outlet header box 23, and, via the outlet branch 21, out of the thermoelectric temperature control unit.

In addition, the insert 24 forms flow ducts within the inlet box 27, allowing the fluid to flow directly through the inlet box 27 into the first flow ducts 11 via the inlet branch 20 and the inlet header box 22.

The reversing header 13 illustrated in FIG. 4 corresponds essentially to the reversing header 13 already illustrated in the previous figures.

Figure 5:
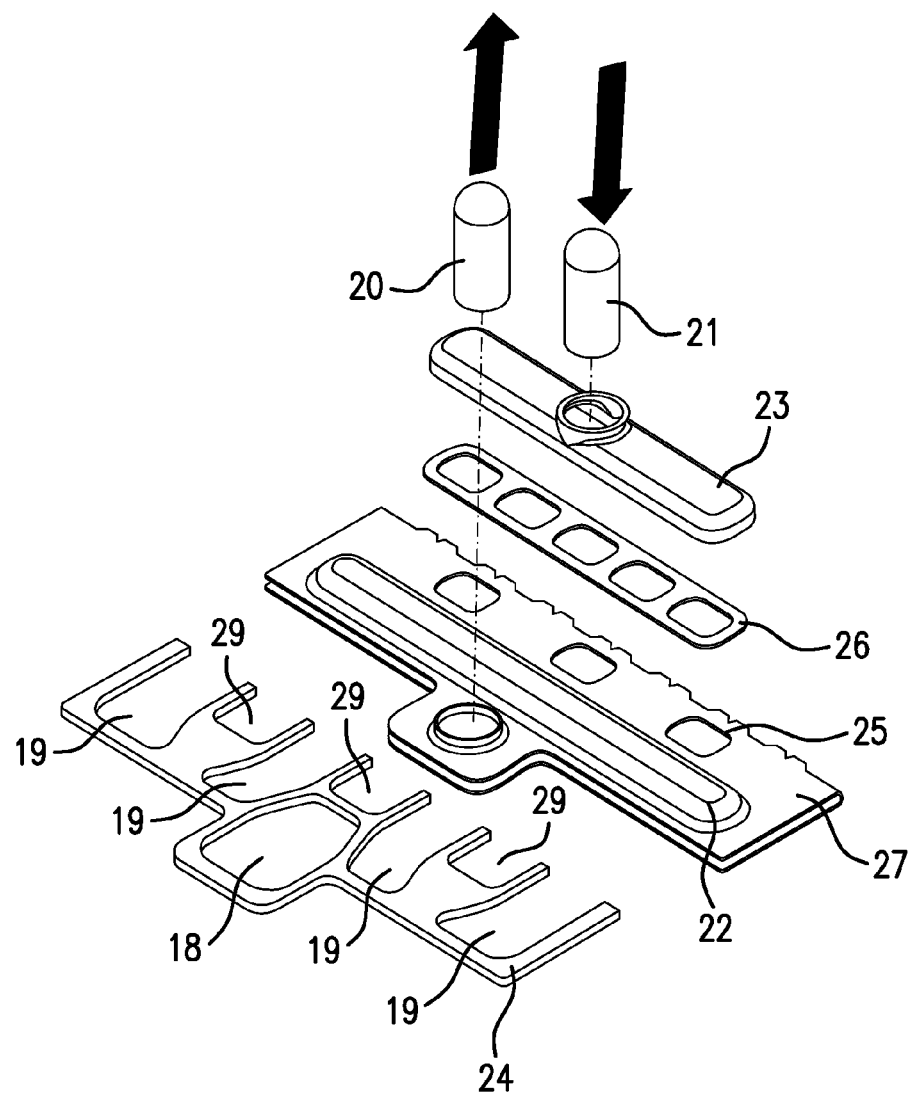
FIG. 5 shows a perspective exploded view of a component part into which the inlet header box and the outlet header box are integrated.

FIG. 5 shows an exploded view of the inlet box 27, which was shown only schematically in FIG. 4. Here, it is possible to see, in particular, the insert 24, which controls the distribution of the fluid into the first flow ducts 11 and the second flow ducts 12.

In FIG. 5, the inlet box 27 is formed by a component part bent in a U shape. The fluid flows through the inlet branch 20 and through the insert 24 which seals off the inlet box 27 from the outside. Via the inlet header 22, which is here provided as an embossed feature in the inlet box 27, the fluid can flow into the aperture 18 of the insert 24 and, from there, it can flow into the four longer apertures 19 via the insert 24. This is made possible by the inlet header 22, which is arranged in the inlet box 27 in such a way that the fluid can flow over the insert 24 in the region of the longer apertures 19, which are in fluid communication with the first flow ducts 11.

It is not possible for the fluid to flow into the three shorter apertures 29, which are in direct fluid communication with the second flow ducts 12, since the path to these three apertures for the fluid is limited or blocked by the arrangement of the inlet header 22.

After flowing through the first flow ducts 11, being deflected in the reversing header 13 and flowing back through the second flow ducts 12, none of which is illustrated in FIG. 5, the fluid reaches the three shorter apertures 29 of the insert 24. From there, the fluid flows via the apertures 25 and the top-mounted perforated plate 26 into the header box 23, which is mounted from the outside on the inlet box 27, and, from said header box 23, flows via the outlet branch 21 out of the thermoelectric temperature control unit 1.

The embodiment, shown here in FIG. 5, of such an inlet box 27 is merely one illustrative embodiment and, in practice, can be achieved by many other arrangements of the inlet and outlet header boxes relative to one another. Apart from embodiment of the inlet and outlet header boxes in a single component part, the arrangement of individual inlet boxes and outlet boxes on the thermoelectric temperature control unit is, of course, furthermore also conceivable.

Figure 6:
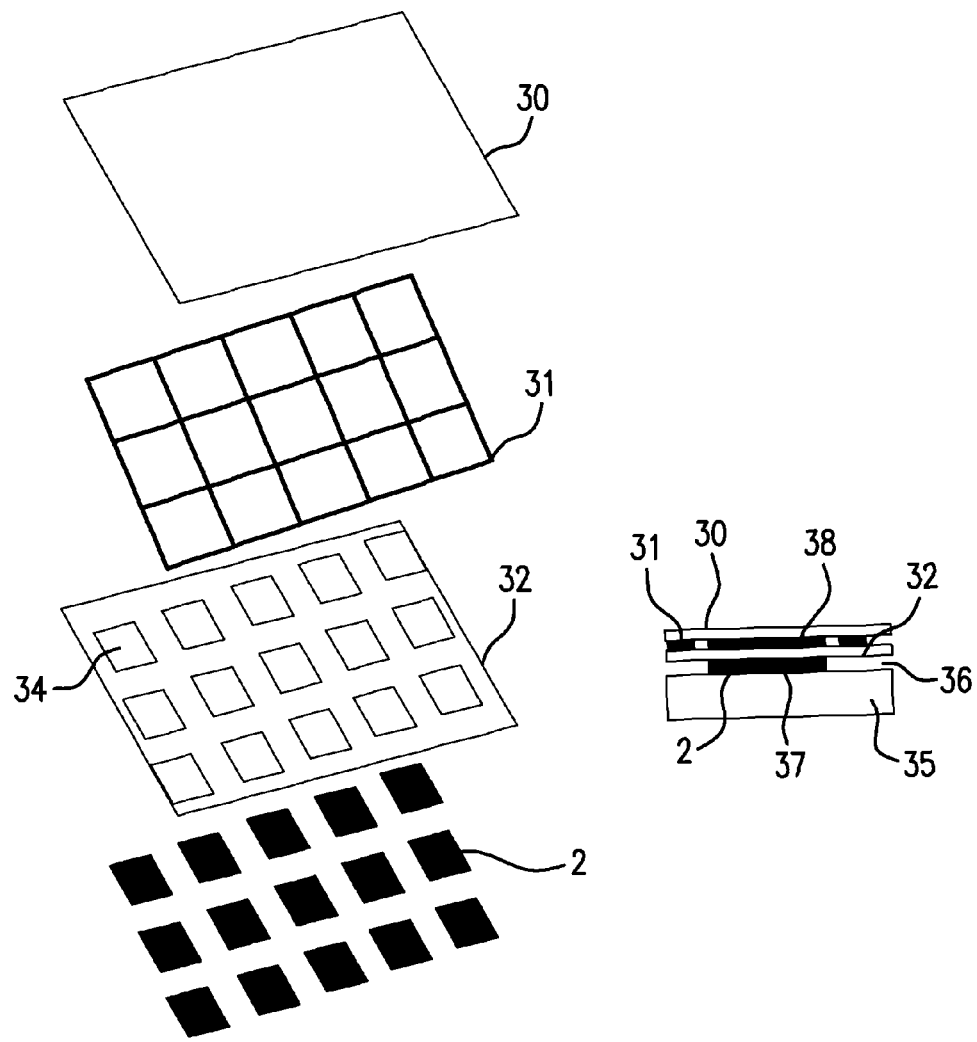
FIG. 6 shows an exploded view of the connection of the Peltier elements on the battery side.

FIG. 6 shows one possible embodiment of the connection of the Peltier elements 2 in the direction of the battery elements 5. Apart from the connection, as already indicated in the preceding figures, using a plate 30, which is then, in turn, connected to the battery elements 5, it may also be necessary to introduce additional reinforcing measures in order, for example, to prevent deformation of the thermoelectric temperature control unit 1 due to thermal stresses.

The structure illustrated in FIG. 6 is suitable for this purpose. In a layered structure, there is first a plate 30, which is subsequently connected directly to the battery elements 5 on its upper side. Arranged below this is a frame 31, which has apertures corresponding to the size and arrangement of the Peltier elements 2. Arranged below this frame 31 is a lower plate 32, which likewise has apertures 34, through which the Peltier elements 2 can be inserted. This layered structure is shown in the left-hand part of FIG. 6. An assembled module comprising the component parts on the left is shown in the right-hand part of FIG. 6.

Here, the Peltier elements 2 are inserted through the lower plate 32, and the frame 31 is placed on the lower plate 32. Plate 30 forms the upper end.

It should be emphasized, in particular, that the second surface 38 of the Peltier elements 2 is in direct thermally conductive contact with the upper plate 30. One or more heat-producing elements can then be connected to plate 30. It should furthermore be mentioned that an air gap 36 must always be maintained between the lower plate 32 and the connection of the Peltier elements 2 to the flow ducts 11, 12, which are represented by the block 35. This air gap 36 serves to provide thermal insulation of the hot side of the Peltier elements 2 from the cold side thereof. The thermal connection of the Peltier elements 2 to the cooling circuit is accomplished by means of the first surface 37 thereof.

This structure for increasing the rigidity of the thermoelectric temperature control unit is also to be regarded as illustrative and can likewise be formed by other means, such as a component part cast in one piece, which can include the upper plate 30, a frame 31 and/or the lower plate 32.

FIG. 7 likewise once again shows a schematic illustration of the flow through the thermoelectric temperature control unit 1. In addition to the structure already shown in FIGS. 2 and 3, the battery elements 40 are now indicated here. These are arranged transversely across the first flow ducts 11 and the second flow ducts 12.

In the first of the battery elements 40, a first qualitative temperature variation is indicated by the curve 42, said variation arising from the different temperatures of the first flow ducts 11 and of the second flow ducts 12 in the lower region of the battery elements 40, that facing the flow ducts 11, 12.

It can be seen that the quality temperature variation 42 is highly dependent on whether a first flow duct 11 or a second flow duct 12 runs under the battery element 40. This is attributable to the different temperatures of the fluid in the flow ducts 11, 12.

With increasing distance within the battery element 40 from the flow ducts 11, 12, this qualitative temperature variation flattens out to a greater and greater extent, however, with the result that the qualitative temperature variation 41 shown is established in the upper region of the battery element 40, showing a largely homogeneous temperature distribution across the width of the battery elements 40.

This is advantageous, in particular because the critical or maximum temperatures occur in the upper regions of the battery elements 5, i.e. those further away from the flow ducts 11, 12, in the case of battery cooling.

The invention claimed is:

1. A thermoelectric temperature control unit for controlling the temperature of an energy storage device in a motor vehicle comprising:
   at least one Peltier element, comprising a first surface and a second surface substantially adjacent or opposite to the first surface,
   wherein the first surface of the Peltier element is thermally connected to a first plate, wherein the first plate comprises two planar surfaces, wherein the first plate is further thermally connected to a heat exchanger comprising a first flow duct and a second flow duct, through which a first cooling fluid can flow, wherein the second surface of the Peltier element is connected in a thermally conductive manner to a first heat-producing element, wherein the first flow duct is in fluid communication at one of the ends thereof with a first header, wherein the second flow duct is in fluid communication at one of the ends thereof with a second header, wherein the first flow duct and the second flow duct are in fluid communication at the respective second ends thereof with a common reversing header, wherein the heat exchanger is connected to a cooling circuit, further comprising a plurality of Peltier elements, wherein the second surface of the Peltier element is connected to a third surface of a second plate, and the fourth surface of the second plate is connected to the at least first heat-producing element, wherein the third surface of the second plate is connected to a frame which has a plurality of first apertures corresponding to the size and the arrangement of the plurality of Peltier elements such that one Peltier element is arranged in each first aperture, wherein the frame is connected to a lower plate which also has a plurality of second apertures corresponding to the size and the arrangement of the plurality of Peltier elements such that one Peltier element is arranged in each second aperture, wherein an air gap is provided between the lower plate and the first plate.

2. The thermoelectric temperature control unit according to claim 1,
wherein the first flow duct and the second flow duct run essentially parallel to one another.

3. The thermoelectric temperature control unit according to claim 1,
wherein the first fluid in the first flow duct can flow as a countercurrent with respect to the first fluid in the second flow duct.

4. The thermoelectric temperature control unit according to claim 1,
wherein the first plate has slots, which are arranged between the first flow duct and the second flow duct.

5. The thermoelectric temperature control unit according to claim 1,
wherein the common reversing header has fluid-conducting structures which carry the first fluid from the first flow duct into the second flow duct.

6. The thermoelectric temperature control unit according to claim 1,
wherein a thermal insulation is arranged between the first header and the second header.

7. The thermoelectric temperature control unit according to claim 1,
wherein the first header and the second header are implemented in a single component part.

8. The thermoelectric temperature control unit according to claim 1,
further comprising a plurality of first flow ducts and a plurality of second flow ducts, wherein the number of second flow ducts is equal to or greater than the number of first flow ducts.

9. The thermoelectric temperature control unit according to claim 1,
wherein individual flow ducts or groups of flow ducts of the first flow ducts and of the second flow ducts are arranged alternately to one another.

10. The thermoelectric temperature control unit according to claim 1,
further comprising a plurality of Peltier elements and a plurality of heat-producing elements.

11. The thermoelectric temperature control unit according to claim 1,
wherein the first heat-producing element is a plurality of battery elements.

* * * * *